United States Patent [19]

Lange

[11] 4,046,555
[45] Sept. 6, 1977

[54] METHOD OF DIRECT REDUCTION OF IRON ORE
[75] Inventor: Georg Lange, Voerde, Germany
[73] Assignee: Thyssen Purofe GmbH, Dusseldorf, Germany
[21] Appl. No.: 603,196
[22] Filed: Aug. 8, 1975
[30] Foreign Application Priority Data
Aug. 13, 1974 Germany .................. 2438790
[51] Int. Cl.² ............................................ C21B 13/02
[52] U.S. Cl. ............................................ 75/35; 75/91
[58] Field of Search ........................ 75/34, 35, 42, 91

[56] References Cited
U.S. PATENT DOCUMENTS

| | | | |
|---|---|---|---|
| 1,638,684 | 8/1927 | Edwin | 75/91 |
| 2,740,706 | 4/1956 | Paull et al. | 75/35 |
| 3,954,444 | 5/1976 | Wenzel | 75/35 |

Primary Examiner—M. J. Andrews
Attorney, Agent, or Firm—Karl F. Ross

[57] ABSTRACT

The stack gas from a shaft furnace in which iron ore is directly reduced is cooled and filtered and then subjected to steam so as to convert its carbon monoxide into carbon dioxide and water. The carbon dioxide and water are then scrubbed out of this stack gas so as to leave virtually pure hydrogen which is heated to a temperature between 400° and 600° C and added to the output of an oxygen reactor that transforms coal and oxygen into a synthetic gas having a carbon-monoxide/hydrogen volume ratio of at least 1.5:1. The addition of this hydrogen to the output of the reactor lowers the volume ratio to 1:1 at most so that this mixture can be reintroduced into the shaft furnace at a temperature of around 1000° C as a reducing gas.

2 Claims, 1 Drawing Figure

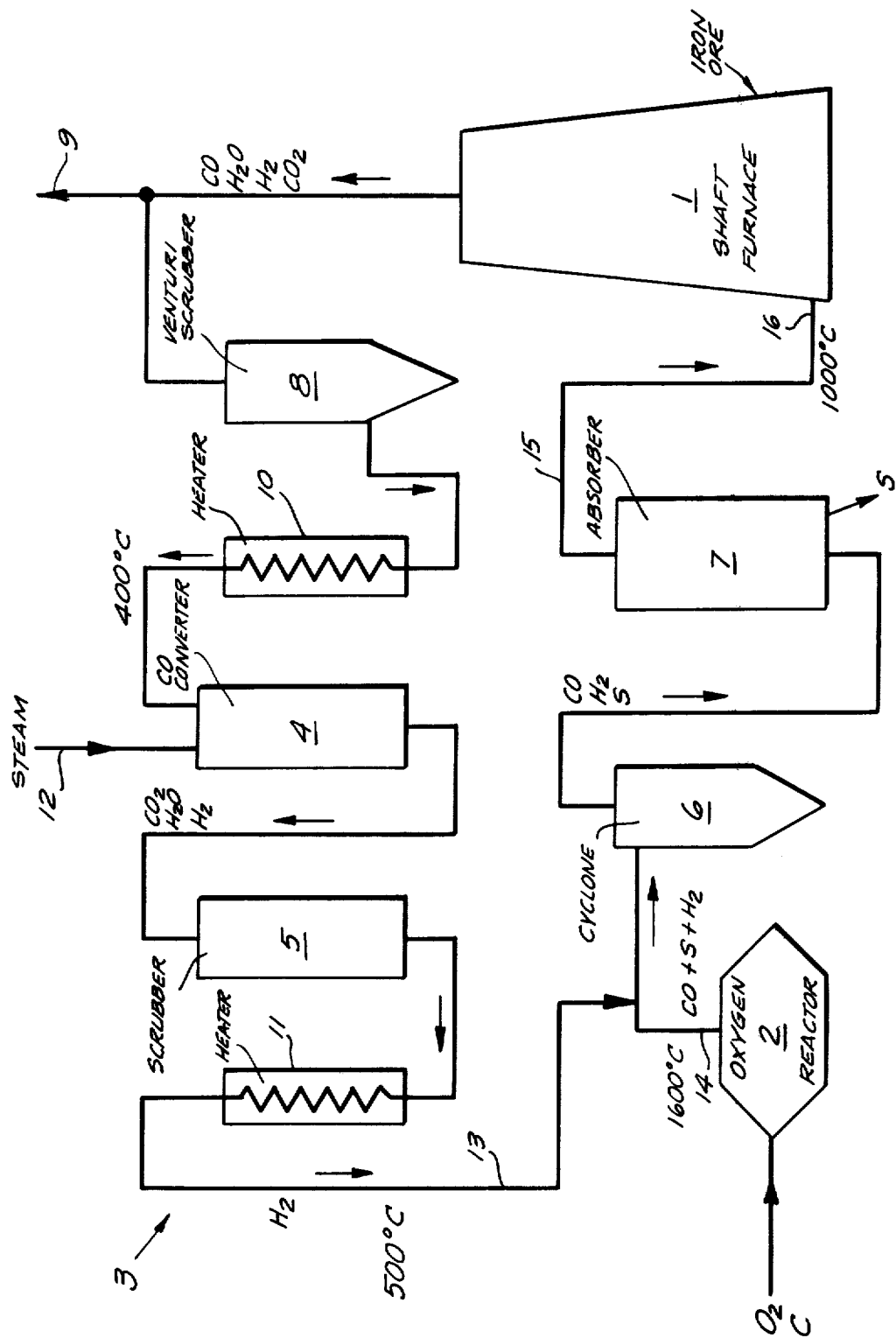

METHOD OF DIRECT REDUCTION OF IRON ORE

FIELD OF THE INVENTION

The present invention relates to the direct reduction of iron ore. More particularly this invention concerns the reduction of iron ore pellets into sponge iron using a reducing gas comprised principally of carbon monoxide and hydrogen.

BACKGROUND OF THE INVENTION

It is known to directly reduce iron ore by use of a reducing gas formed through the gasification of hydrocarbon. Natural gas is conventionally converted thermally or catalytically, if necessary with the addition of steam and/or oxygen, to a reducing gas formed principally of carbon monoxide and hydrogen, with the ratio between these two components being 1:1 or less. This reducing gas is then fed substantially at the temperature it attains in the conversion process into the shaft furnace where the direction reduction takes place. A portion of the stack gas produced by direct reduction is fed back to the converter as an oxygen-carrier where its carbon monoxide and hydrogen content is exploited. Another portion of the stack gas is used for simple heat exchange.

The principal difficulty with such a system is that it must employ relatively expensive basic fuels for the production of the original reducing gas. Thus natural gas or other light hydrocarbons must be employed.

It is known to gasify coal with oxygen to produce a mixture of carbon monoxide and hydrogen. See for example "Vergasung fester Brennstoffe und Oxydative Unwandlung von Kohlenwasserstoffen" by Jacques Meunier (Verlag Chemie GmbH, Weinheim/Bergstrasse: 1962 ).

The synthetic-gas mixture so produced has a carbon monoxide/hydrogen ratio of at least 1.5:1. Use of this gas as a reduction gas produces a very wet stack gas having a carbon monoxide or carbon dioxide to hydrogen and water ratio of approximately 1.5:1. Filtering out of the water and dust in this stack gas by heating it up again to 1000° C causes the carbon monoxide to decay into soot and carbon dioxide, making the operation extremely messy and, therefore, costly.

OBJECTS OF THE INVENTION

It is therefore an object of the present invention to provide an improved direct-reduction method.

It is another object of this invention to provide such a method which allows a relatively cheap fuel such as coal to be employed for the production of the basic reducing gas, and which at the same time is able to recirculate and employ any usable constituents of the stack gas.

SUMMARY OF THE INVENTION

These objects are attained according to the present invention in a system wherein coal and oxygen are reacted to make a producer gas formed principally of carbon monoxide and hydrogen in a volume ratio of at least 1.5:1. The stack gas is treated with steam to convert it into a mixture of carbon dioxide and hydrogen and then this carbon dioxide is scrubbed out of the stack gas leaving relatively pure hydrogen. This hydrogen is added to the producer gas produced by the gasification of coal so as to form a reducing gas having a carbon monoxide/hydrogen volume ratio of at most 1:1, which gas is usable for the reduction of iron ore.

In accordance with the present invention the stack gas as it issues from the shaft furnace in which the iron ore is reduced is first passed through a venturi scrubber and then through a heater where its temperature is raised to around 400° C. Thereafter superheated steam is added to the gas for water-gas shift reaction that reduces the carbon monoxide in the gas to carbon dioxide. Another scrubbing strips the carbon dioxide and water from the gas, leaving almost pure hydrogen which is heated to a temperature of between 400° and 600 ° C and added to the very hot gases issuing from the oxygen reactor where the coal is gasified.

In the oxygen reactor according to this invention a sufficient quantity of oxygen is reacted with the elemental coal so as to produce a very hot gas mixture, above 1300° C, to which is added the relatively pure hydrogen coming from the stack-gas recirculator. This entire mixture is cycloned to remove any particular impurities and then pass through an adsorber or stripper to remove sulfur from it. The resulting reducing gas is at a temperature of approximately 100° C and has approximately equal parts by weight of carbon monoxide and hydrogen.

With the system according to the present invention it is possible to use a very cheap starting fuel such as coal or crude oil, but to enrich the synthetic gas produced therefrom by the addition thereto of hydrogen recovered from the stack gas. In this manner decoy of the carbon monoxide into soot is almost completely eliminated.

BRIEF DESCRIPTION OF THE DRAWING

The above and other objects, features, and advantages of the invention will become more readily apparent from the following description, reference being made to the drawing whose sole FIGURE is a schematic diagram of a system for carrying out the accompanying method according to the present invention.

SPECIFIC DESCRIPTION

A shaft furnace 1 is fed with iron ore and reducing gas and produces a stack gas comprising mainly carbon monoxide, water, hydrogen, and carbon dioxide, along with various particulate impurities. The reducing gas is produced initially by an oxygen reactor 2 and the stack gas is recirculated through an arrangement 3 described below.

Part of the stack gas is not recirculated but is used as indicated by arrow 9 for heat exchange and other purposes. The balance of the stack gas is fed to a venturi scrubber 8 where it is stripped of particulate material and its temperature is dropped considerably. From this scrubber 8 the gas is passed through a heater 10 where its temperature is raised to approximately 400° C. Thereafter the particle-free stack gas, still comprising basically carbon monoxide, water, hydrogen, and carbon dioxide, is fed to a carbon monoxide converter 4 to which steam is fed as indicated at 12. In this converter 4 a so-called water-gas shift reaction takes place, that is the carbon monoxide and water in the gas are transformed principally into carbon dioxide and hydrogen, thus $CO + H_2O \rightarrow CO_2 + H_2$.

After exiting from the scrubber 4 the gas, which is now free of carbon monoxide, is passed through another scrubber 5 where the water is stripped from the gas and the carbon dioxide is absorbed. This leaves virtually pure hydrogen which is then heated by means of a heater 11 to approximately 500° C and fed to a line 13.

In the oxygen reactor 2 coal is reacted with oxygen much as described on page 549 ff of *Chemical and Process Encyclopedia* by D. M. Considine (McGraw Hill: 1974). At the output side 14 of this reactor 2 a gas mixture is produced having a temperature of approximately 1600° C and comprised basically of carbon monoxide and hydrogen in a ratio of 1.5:1, with various particulate impurities and sulfur. The line 13 carrying the 500° C hydrogen from the heater 11 is connected to the line 14 to form a mixture that is fed to a cyclone 6 where all of the particulate impurities are removed from the gas. Thereafter the particle-free gas is stripped of its sulfur by an adsorber 7 of the type using dolomite. Finally the output 15 of the adsorber 7 is connected to the reducing-gas input 16 of the shaft furnace 1 so as to feed to this input 16 a mixture of carbon monoxide and hydrogen in a ratio of at most 1:1 by weight and at a temperature of approximately 1000° C.

I claim:

1. In the reduction of iron ore wherein the ore is subjected to a reducing gas and a stack gas is produced, the improvement comprising the steps of:
   a. reacting coal and oxygen to make a producer gas of carbon monoxide and hydrogen in a volume ratio of at least 1.5:1 and sulfur and at a temperature of about 1600° C;
   b. treating said stack gas with steam to convert said stack gas into a converter-gas mixture of carbon dioxide and hydrogen;
   c. scrubbing said carbon dioxide out of the converter-gas mixture of step (b) to form a hydrogen-containing gas;
   d. heating said hydrogen-containing gas to a temperature of about 400° C;
   e. adding the producer gas of step (a) to the hydrogen-containing gas of step (d) to form a reducing gas having a volume ratio of carbon monoxide to hydrogen of at most 1:1
   f. stripping sulfur from the gas produced in step (e);
   g. reducing the iron ore with the reduction gas of step (f).

2. The improvement defined in claim 1, further comprising the step of cooling said stack gas to between 400° C and 600° C prior to treating same with steam.